3,105,845
Patented Oct. 1, 1963

3,105,845
DIISOCYANATO AROMATIC COMPOUNDS
Lloyd C. Fetterly, Oakland, David O. Collamer, Orinda, and Curtis W. Smith, Berkeley, Calif., assignors to Shell Oil Company, a corporation of Delaware
No Drawing. Original application Sept. 14, 1954, Ser. No. 456,078, now Patent No. 3,089,862, dated May 14, 1963. Divided and this application Dec. 15, 1958, Ser. No. 780,214
6 Claims. (Cl. 260—453)

This invention relates to a new class of diisocyanato- and diisothiocyanato-substituted aromatic compounds. More specifically, the invention relates to novel polysubstituted compounds of this type having especially advantageous properties and to the utilization of these new compounds.

The invention provides new and useful compounds which can be described as compounds having a benzene ring to which two, and only two, substituents of the group consisting of the isocyanato and isothiocyanato radicals are directly attached and having an alkyl group in each of the positions ortho to said functional groups. Due to this characteristic structural arrangement of the groups attached to the benzene ring, the novel diisocyanates, diisothiocyanates and isocyanatoisothiocyanates have unexpected beneficial properties which make them particularly adapted for important commercial applications.

Organic polyisocyanates and polyisothiocyanates are known to be useful in the preparation of polymeric materials due to their ability to react with hydroxy, carboxyl, amine and like groups containing active hydrogen atoms. The use of these compounds as curing or vulcanizing agents for a variety of different types of polymers is described, for example, in U.S. Patent 2,381,063. In Industrial and Engineering Chemistry, vol. 46, pages 1498–1507 (1954), other polymers from diisocyanates and polyols are described. It is pointed out in U.S. Patent 2,625,535 that careful control is essential in order to obtain products of this type having advantageous physical properties. One thing which contributes to the difficulty in obtaining products of the most desirable properties in such reactions is the tendency toward excessive cross-linking between polymer molecules which has been found to occur with the reactants heretofore employed. It is on this account that it has been found essential to use compounds with not more than two reactive isocyanato or isothiocyanato groups in the molecule for the preparation of polymers having desirable rubber-like properties. Even when using this type of compound, difficulties have been encountered due to the ease with which the initial reaction product can undergo further reaction with the organic diisocyanates and diisothiocyanates previously available. Thus, for example, when reacting a diisocyanate with a hydroxy, carboxyl, or amino group, the respective products will contain urethane amide 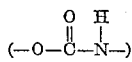

and substituted urea 

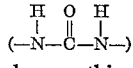

linkages, while the analogous thio groups,

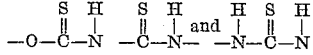

are formed when using a diisothiocyanate. All of these groups contain active hydrogen atoms which readily react with another molecule of the diisocyanate or diisothiocyanate. This can lead to excessive cross-linking which often makes the product difficult to process or otherwise gives it less desirable properties. The compounds of the present invention, being less subject to such undesirable further reaction under these circumstances, facilitate production of polymeric products of improved properties.

The new compounds of the invention can be divided into subclasses according to the relative positions of the two isocyanato and/or isothiocyanato groups in the molecule. The compounds which have been found to be most advantageous for the production of linear polymers are those having the two —N=C=X groups (X being oxygen or sulfur) attached to non-adjacent ring carbon atoms. Those in which the —N=C=X groups are in ortho position to each other are much less useful as polymer linking agents or the like than the new compounds of the invention which have these groups further removed from each other. Especially preferred compounds are those having the two —N=C=X groups linked to the benzene ring in para position to each other. The subclasses of the new compounds are characterized respectively by the following general formulae:

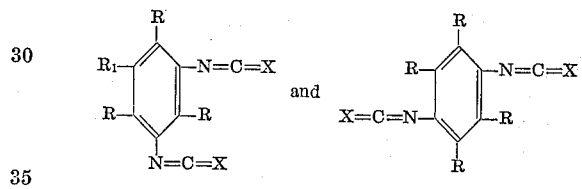

wherein X represents an oxygen or a sulfur atom, R represents an alkyl radical, and $R_1$ represents a hydrogen atom or an alkyl radical.

Examples of the preferred alkyl hydrocarbon radicals of 1 to 18 carbon atoms represented by R and/or by $R_1$ include such straight chain alkyl radicals as the methyl, ethyl, butyl, amyl, octyl, lauryl and stearyl radicals, and such branched-chain alkyl radicals as the isopropyl, secondary, tertiary, and isobutyl, 2-ethyl hexyl, and tetramethyl octyl radicals.

The tetraalkyl-substituted benzene diisocyanates and diisothiocyanates having the functional groups in meta or para position form an especially preferred subgroup of the compounds of the invention. This subgroup of compounds has the double advantage of not only sharing the unexpected desirable properties which characterize the class of new compounds as a whole but also having special advantages of its own while furthermore being readily synthesized in high yields as pure or substantially pure products uncontaminated by undesirable isomers. Among the simpler members of this subgroup are, for example, Isodurene diisocyanate

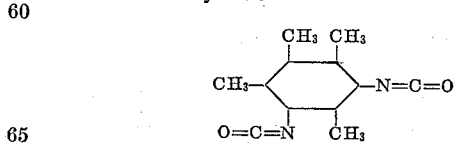

Isodurene diisothiocyanate

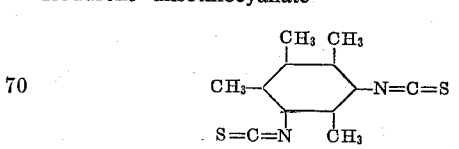

Isothiocyanatoisodureneisocyanate

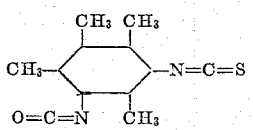

Durene diisocyanate

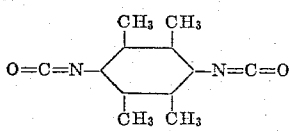

Durene dithioisocyanate

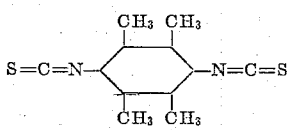

Isothiocyanatodureneisocyanate

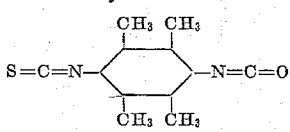

Exemplary of the corresponding higher alkyl compounds of this advantageous subgroup of the new compounds of the invention are, for instance: 1,2,3-trimethyl-5-ethyl-4,6-diisocyanatobenzene; 1,3-dimethyl-2,5-diethyl-4,6-diisothiocyanatobenzene; 1-methyl-2-ethyl-3,5 - diisopropyl-4,6-diisocyanatobenzene; 2,6-dimethyl-3,5 - ditertiarybutyl-1,4-diisocyanatobenzene; 2,5-diethyl-3,6-diisopropyl-1,4-diisothiocyanatobenzene; 2-methyl-3-ethyl-5-isobutyl-6-hexyl-1,4-diisocyanatobenzene; and 2,3,5,-trimethyl-6-decyl-1-isocyanato-4-isothiocyanatobenzene.

With all the new compounds having the two

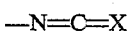

groups in para-positions on the same benzene ring, it is necessary that the remaining four positions be occupied. When the —N=C=X groups are in meta position to each other, only the three positions need be occupied. Typical of the new compounds of this subgroup are the following:

1,3,5-trimethyl-2,4-diisocyanatobenzene

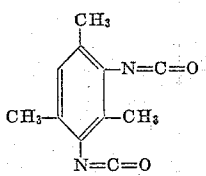

1,3,5-trimethyl-2,4-diisothiocyanatobenzene

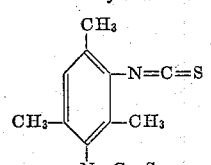

1,3,5-trimethyl-2-isocyanato-4-isothiocyanatobenzene

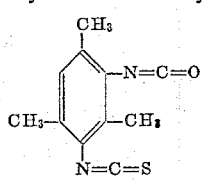

and their higher alkyl isomers such as 1-decyl-3,5-diethyl-2,4-diisocyanatobenzene; 1-isopropyl-3-methyl-5-ethyl-2,4-diisocyanatobenzene; 1-allyl-3,5 - dimethyl - 2,4 - diisocyanatobenzene; 1-amyl-3-(2-ethylhexyl)-5-methyl-2,4-diisothiocyanatobenzene; and the like.

The new compounds of the invention can be produced in various ways. One suitable method utilizes as starting materials the corresponding aromatic primary diamines having the ring carbon atoms ortho to the amino groups occupied by alkyl groups, which are readily available or can be produced by known methods. For the production of the diisocyanates, the starting primary diamine or its hydrohalide salt is reacted with phosgene. U.S. Patents 2,680,127–130, for example, describe in detail suitable methods for carrying out this reaction. When the diisothiocyanates are the desired product, one can carry out the reaction in an analogous manner using thiophosgene instead of phosgene for reaction with the chosen aromatic primary diamine. The new diisothiocyanates can also be produced successfully by reacting the corresponding aromatic amines with carbon bisulfide, ammonium hydroxide and lead nitrate. Also, aryl thioureas decompose thermally in a solvent to give aryl isothiocyanates and ammonia. The mixed isocyanato-isothiocyanato compounds are readily obtained by heating the corresponding diisothiocyanates with mercurous oxide, preferably using not more than one mole of the oxide per mole of the diisothiocyanate so as to convert one of the isothiocyanate groups to an isocyanate group without converting the other isothiocyanate group. The products of this reaction are mixtures of diisocyanate, diisothiocyanate and mixed isocyanate-isothiocyanate. These compounds can be separated by distillation, or can usually be used successfully without separation.

The following examples illustrate the production of new compounds of the invention by the foregoing methods, but it will be understood that other methods can be used.

*Example I*

Durene diisocyanate was prepared by dissolving durenediamine in anhydrous chlorobenzene in a stirred reactor provided with a reflux condenser and heating coil, adding anhydrous hydrogen chloride to convert the diamine to the dihydrochloride, and heating the resulting suspension at 110° C. with vigorous stirring while feeding in phosgene in excess over a period of 2.5 hours. The mixture was then refluxed at 132° C. for half an hour to drive off hydrogen chloride from the carbamyl chloride. The first crop of white crystals was 57% of the theoretical amount of durene diisocyanate and melted at 113.5°–114° C. Vacuum evaporation of the mother liquor gave a light tan solid (43% of the theoretical yield) melting at 112° C. which was recrystallized from Skellysolve B as white crystals melting at 113.5°–114° C. for a 94% total yield of durenediisocyanate based upon the durene diamine employed.

*Example II*

Durene diisothiocyanate is produced by reaction as in Example I, using thiophosgene instead of phosgene.

*Example III*

Prehnitene diisocyanate is produced by reacting prehnitene diamine dihydrochloride with phosgene under the conditions of Example I.

*Example IV*

Isodurene diisocyanate is produced, by reacting under the conditions of Example I, isodurene diamine dihydrochloride with phosgene.

*Example V*

Mesitylene diisocyanate is produced by reacting mesitylene diamine dihydrochloride with phosgene in chlorobenzene solution at 110°–130° C. and recovering the crystalline product as in Example I.

*Example VI*

Mesitylene diisothiocyanate is produced by reacting mesitylene diamine dihydrochloride with thiophosgene under the conditions of Example V.

The new compounds are valuable intermediate in the production of other useful compounds. By reaction with hydroxy compounds they form useful carbamates, for example. Thus, warming the durene diisocyanate of Example I with excess ethyl alcohol gave the solid durene urethane

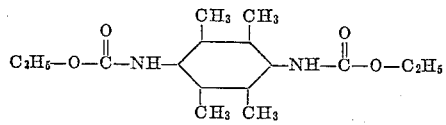

melting point >274° C. Corresponding products from isopropyl, allyl, tertiary butyl and decyl alcohols are also useful new compounds. In general, the mono- and di-carbamates of the new diisocyanates and diisothiocyanates with monohydric alcohols, preferably aliphatic alcohols, of 1 to 12 carbon atoms per molecule are valuable products of the invention.

Especially important new compositions of the invention are the polymers which are obtainable from the new diisocyanates and diisothiocyanates, particularly the polyurethanes which can be produced by reaction with polyols. Polyurethanes having desirable properties can, for example, be obtained by warming the new diisocyanates and diisothiocyanates with ethylene glycol, propylene glycol, trimethylene glycol, and the like. For instance, durene diisocyanate warmed with the stoichiometric amount of 1,4-butanediol gives a high melting polymer, while similar reaction with 1,5-pentanediol gives a lower melting polymer. Polymers of more advantageous properties are produced by similarly reacting dihydric alcohols having the carbinol groups separated by at least 4 carbon atoms, more preferably 6 to 22 carbon atoms. Typical examples of diols of this type which form valuable polymers with the new diisocyanates and diisothiocyanates are 1,8-octanediol, 1,10-decanediol, 1,16-hexadecanediol and 1,20-eicosanediol. In preparing polymers of this kind one can use mole ratios of the new ortho alkyl-substituted diisocyanates and diisothiocyanates to diol of 0.7:1 to 1.3:1 and obtain useful linear products, but we prefer to use these compounds in about chemical equivalent proportions or a small excess up to about 10 mole percent of diol.

Another useful type of polyol which can be employed in producing polymers with the new compounds of the invention are the polyhydroxy ethers, particularly the polyalkylene glycols such, for instance, as the polyethylene glycols having 2 to 20 or more ethylene groups per molecule, the related polypropylene, polybutylene and like glycols.

Especially advantageous polymeric products are obtained by reacting the new aromatic diisocyanates and diisothiocyanates with polyesters having at least two hydroxy groups in the molecule. One or more of these hydroxy groups can be carboxyl hydroxy groups, but more preferably at least one, and most preferably at least two, are carbinol hydroxy groups. These polyesters can be produced by known methods. They are prepared, for example, by heating one or more dibasic carboxylic acids with a glycol or mixture of glycols. Ordinarily no catalyst is necessary but the condensation can be accelerated by using p-toluenesulfonic acid, zinc or stannic chloride, hydrochloric acid, calcium acetate or the like. These catalysts are usually employed in amounts of the order of about 0.1% to 5% by weight of the reactants. The proportion of dibasic acid to glycol can be varied widely. Generally, the acids are reacted with about equimolar amounts to 50% excess of glycol, but excess dibasic acid can also be used in the reaction. It is preferred as a rule to use molar ratios of acid to glycol within the range of 1:1.3 to 1.1:1. In most cases temperatures in the range of about 100° C. to 300° C. are satisfactory and, most preferably, the water formed in the reaction is removed as fast as it is produced.

Any dibasic carboxylic acid can be used in preparing the polyesters which are reacted with the new diisocyanates or diisothiocyanates of the invention. Representatives examples are succinic, adipic, glutaric, sebacic, tartaric, terephthalic, beta-methyladipic, octadecylsuccinic, 1,20-eicosanedioic and like acids. Preferably saturated dicarboxylic acids having the carboxyl groups attached to terminal carbon atoms are used. Any of the previous mentioned glycols can be used for condensation with these dibasic acids in making polyesters reactive with the new compounds. Ethylene glycol, propylene glycol, di- and tri-ethylene glycols, pentamethylene glycol, dodecamethylene glycol, glycerine beta-monomethyl ether, thiodiglycol, glycerol monoacetate, are typical of the dihydroxy compounds which can be successfully used. It is often advantageous to employ a mixture of diols in preparing the polyesters. For instance, 75 mole percent ethylene glycol and 25 mole percent propylene glycol in about 20% excess condensed with adipic acid, or 80 mole percent ethylene glycol and 20 mole percent of hexamethylene glycol with 100 mole percent of sebacic acid, give polyesters which are useful for reaction with the substituted aromatic diisocyanates and diisothiocyanates of the invention. In general, we prefer to use dicarboxylic acids and glycols which contain not more than 20 carbon atoms per molecule; most preferably, acids of 6 to 12 carbon atoms are used with glycols having 2 to 8 carbon atoms per molecule.

Instead of the foregoing polyesters, polyester amides such as are formed by condensing the foregoing dibasic carboxylic acids with a mixture of one or more glycols and an amino alcohol or diamine, or both, are useful in forming polymeric products with the new substituted aromatic diisocyanates and diisothiocyanates. Suitable amino alcohols are the primary and secondary amino-substituted alcohols, for example, ethanolamine, 3-amino-propanol, 5-amino-pentanol, 8-amino-octanol, 10-amino-decanol, 12-amino-dodecanol, N-ethyl-ethanolamine, etc. Representative of the diamines are, for instance, ethylene diamine, tetramethylene diamine, hexamethylene diamine, 1,6-diamino-nonane, 2,10-diamino-dodecane, ethyl aminopropyl-amine, 2,2'-diaminoethyl ether, piperazine and the like. These polyesteramides can be prepared by reaction, without need for acid catalysts, under the same conditions as are used in producing the previously described polyesters. Preferably not more than one-third of the reactive hydroxyl and amino groups in the mixture condensed with the dicarboxylic acid are amino groups and, more preferably, only about 5% to 15% of such groups are amino groups.

The reaction of the polyols and polyesteramides of the types described with the substituted aromatic diisocyanates and diisothiocyanates, having all positions ortho to the isocyanato and isothiocyanato groups occupied, can be carried out in a variety of ways. Ordinarily the reaction is quite rapid at relatively low temperatures, simple warming of the reactants being sufficient to bring about substantial reaction in most cases. In general, temperatures of about 40° to 250° C. can be used, but it is preferred to employ temperatures below about 100° C. The reaction is carried out in the liquid phase with or without solvents or diluents. The preferred solvents or diluents are inert liquids at the chosen operating temperature and pressure. Reaction times of the order of 2 or 3 minutes or less up to an hour or more can be used. It is often advantageous to carry out the reaction under a blanket of inert gas such as nitrogen, carbon dioxide, ethane, etc. Atmospheric, superatmospheric or subatmospheric pressure can be used.

The proportions in which the new diisocyanates and diisothiocyanates are employed relative to the polyol or polyols can be varied widely. Chemical equivalent amounts are often advantageous but an excess of either reactant in amounts as high as 100% has been found satisfactory depending upon the nature of the polymer which is desired. Higher proportions of diisocyanate or diisothiocyanate or of polyol can be used. Depending upon the proportions used, new polymers can be produced which are hard infusible resinous materials, tough leathery products, fiber-forming compositions, elastic rubbery materials, and soft waxes or viscous liquids.

The following examples show in more detail how the new polymer products can be prepared, although it will be understood that other methods of producing these polymers can also be used.

*Example VII*

Durene diisocyanate, 40 parts, and 1,4-butanediol, 17 parts by weight, were stirred and heated on a boiling water bath for about one-half hour. The mass increased in viscosity and finally a tough solid polymer remained. The polymer did not melt at 274° C.

*Example VIII*

By the method of Example VII, durene diisothiocyanate prepared by the method of Example II is reacted with an equal molecular amount of 1,10-decanediol. When recovered in the same way, the polyurethane polymer is much softer and more flexible than the polymer of Example VII.

*Example IX*

Illustrative of the production of durene diisocyanate-modified polyesters is the reaction of 0.95 mole of durene diisocyanate per mole of the polyester produced by condensing a mixture of 60% ethylene glycol and 40% propylene glycol with adipic acid using a 20% mole excess of total glycol by melting the waxy polyester with the durene diisocyanate at about 125° C. After thorough mixing, the produce was heated for 5 hours at 145° to obtain to rubbery polymer.

In the same way excellent products are obtained by substituting isodurene diisocyanate or prehnitene diisocyanate for the durene diisocyanate. Due to the presence of substituent groups on the ring carbon atoms ortho to the isocyanato groups, the NH groups in all these urethanes are less subject to attack by isocyanates than is the case when the diisocyanates hitherto available are used in the polymers. As a result, the present products afford a more stable "pot-life" for the polymer intermediates and give polymers of especially useful characteristics. For use in the preparation of polymeric materials, the diisocyanato compounds of the invention having the isocyanato groups in para position on a benzene ring are preferred. Durene diisocyanate is a most advantageous compound of this type. In all cases the new diisocyanato-, diisothiocyanato- and isocyanato-thioisocyanato-benzenes of the invention which have the most advantageous properties are those having alkyl groups of 1 to 18 carbon atoms and especially those containing only lower alkyl groups of 1 to 5 carbon atoms.

The new polymers can be used alone or with other polymers with or without other materials such as pasticizers, softeners, pigments, stabilizers, solvents, etc.

While the use of the new diisocyanates and diisothiocyanates in the manufacture of polymeric products has been emphasized because of their great advantage over prior compounds in this field, these new products have other advantageous uses. They are especially valuable agricultural chemicals, durene diisocyanate and durene diisothiocyanate being particularly useful in this respect. The invention is not limited to the examples which have been given by way of illustration nor by any theory proposed in explanation of the improved results which are obtained.

The foregoing polymeric products of reaction of the alkyl-substituted diisocyanato-, diisothiocyanato- and isocyanto-isothiocyanato-benzenes of the invention with polyhydroxy compounds are claimed in copending application, Serial No. 456,078, filed September 14, 1954, of which the present application is a division.

We claim as our invention:

1. A difunctional polyalkylbenzene having two isocyanato radicals directly attached to nonadjacent ring carbon atoms of the benzene ring as the functional groups and having an alkyl radical of 1 to 18 carbon atoms directly linked to both of the ring carbon atoms adjacent to the carbon atoms to which said isocyanato radicals are attached.

2. A tetraalkylbenzene diisocyanate having the isocyanato groups attached to nonadjacent carbon atoms of the ring and having 1 to 18 carbon atoms in the alkyl groups.

3. A compound of the following formula:

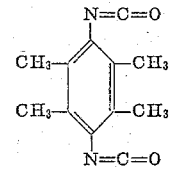

4. Isodurene diisocyanate.

5. A 1,3,5-trialkyl-2,4-diisocyanatobenzene having 1 to 18 carbon atoms in the alkyl groups.

6. An organic diisocyanate of the formula

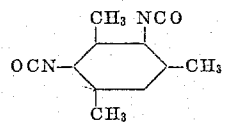

References Cited in the file of this patent

FOREIGN PATENTS

F16,475    Germany              July 5, 1956
779,806    Great Britain         July 24, 1957

OTHER REFERENCES

Siefkin, W.: Ann. 562 (1949), pages 75, 116, 127 and 135.